J. Lee,
Making Eaves-Troughs.

N° 7,704. Patented Oct. 8, 1850.

United States Patent Office.

JOHN LEE, OF WELLSVILLE, OHIO.

IMPROVED EAVES-TROUGH AND GUTTER MACHINE.

Specification forming part of Letters Patent No. 7,704, dated October 8, 1850.

*To all whom it may concern:*

Be it known that I, JOHN LEE, of Wellsville, in the county of Columbiana and State of Ohio, have invented certain Improvements in Machinery for Making Metal Gutters; and I do hereby declare that the following is a full, clear, and exact description of the principle or character which distinguishes them from all other things before known, and of the usual manner of making, modifying, and using the same, reference being had to the accompanying drawings, of which—

Figure 2:
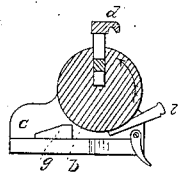
Figure 1:
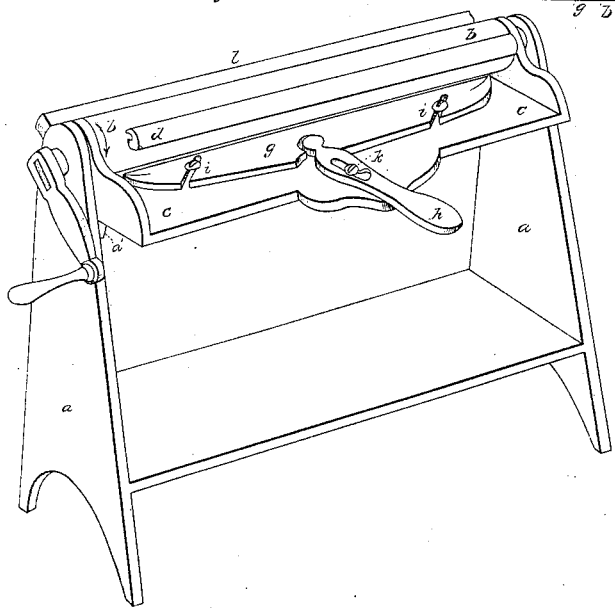

Figure 1 is a perspective view; Fig. 2, a cross-section, and Fig. 3 a longitudinal section of a part of the mandrel.

The object of my invention is to facilitate the manufacture of tin gutters or eaves-troughs by the use of a machine which bends the tin plates to the proper shape, and holds them while they are soldered together in long lengths, and admits of quickly detaching and removing the work when finished without the necessity of slipping it off endwise. The machine also admits of turning the work for the convenience of soldering while the tin is held firmly to the mandrel.

Figure 3:
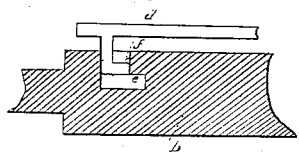

The machine consists of a frame, $a$, having bearings in which the journals of the mandrel $b$ turn. A piece, $c$, is attached to the journals of the mandrel on which it swings, and has a small play endwise between the upright standards of the frame, so that when drawn to one end it rests on and is kept in position by a ledge, $a'$, on one of the standards. The mandrel or former $b$ is made of the proper size for the gutter to be shaped to it, and has a crank-handle outside the frame, by which it is turned round. It also has a longitudinal rib, $d$, for the purpose of receiving and holding the beaded edge of the sheets during the operations of bending and soldering. The rib $d$ is made with a groove underneath to receive the bead, and, for the purpose of inserting it and releasing it when the work is completed, the rib is made to lift off a short distance from the mandrel. It is attached by three hook-shaped tenons, which enter corresponding mortises in the mandrel, as shown in Fig. 3. The rib is secured down to the mandrel by pushing it lengthwise from the handle end, the hooked ends of the tenons catching under the shoulders $e$ in the mortise. When it is required to raise the rib, it is first pushed toward the handle end, and can then be raised sufficiently high, being prevented from getting too far out by the pins $f$ in the mortise. On the piece $c$ is the straight-edge $g$, which is made to slide to or from the mandrel by the lever $h$. $i$ are pins which serve to guide the straight-edge $g$. The lever $h$ has a slot which works on a pin, $k$, and at the end of the slot is a notch which retains the straight-edge pressed against the mandrel, when required. At the back of the piece $c$ is a temporary rest, $l$, for the sheets while being placed in the machine. It slides in grooves in the ends of the piece $c$, and is removed while the sheets are being made into a gutter.

To operate with the machine the rest $l$ is inserted in the piece $c$, which is steadied by the ledge $a'$. The straight-edge $g$ is drawn back and the rib $d$ drawn toward the handle and raised up, the mandrel being turned so as to have the rib on top. The sheets of tin, previously beaded on one edge, are then laid with their beaded edges under the rib $d$, and being supported by the rest $l$. The rib is then closed down on them and pushed from the handle end, which locks it down and holds the sheets firmly by the bead. The rest $l$ is then removed and the mandrel turned in the direction of the arrow till the rib has passed the straight-edge $g$, which is then forced against the mandrel by the lever $h$, and retained in place by the notch in the slot catching on the pin $k$. A further revolution of the handle causes the tin to be bent to the shape of the mandrel. The mandrel is then secured in its position with regard to the piece $c$ by a pawl catching in a notch, which prevents its springing back. The tin is then ready for soldering, for the convenience of which operation the piece $c$, with the mandrel, &c., is pushed off the ledge $a'$, and can be then turned to any position required for that purpose. When the soldering is completed, the rib $d$ is pushed toward the handle, and can be then lifted up to release the finished gutter.

It is evident that by this machine gutters can be made with much greater facility than by any other mode hitherto in use, and they can be made in long lengths (eight or ten feet) with this machine, which takes up but little shop-room.

What I claim as my invention, and which I desire to secure by Letters Patent, is—

1. The grooved movable rib $d$, locking down to the mandrel for the purpose of holding the beaded edges of the sheets while bending and soldering, and rising to allow of inserting and removing the work, substantially as described.

2. In combination with the revolving mandrel, the piece $c$, suspended on the journals of the mandrel, and resting, when required, on the ledge $a'$, substantially in the manner and for the purposes described.

JOHN LEE.

Witnesses:
 WM. C. PUSEY,
 JAS. MILLIGAN.